Nov. 6, 1956    C. H. BOOTH    2,769,225
CUTTING AND ABRADING TOOL
Filed May 2, 1952
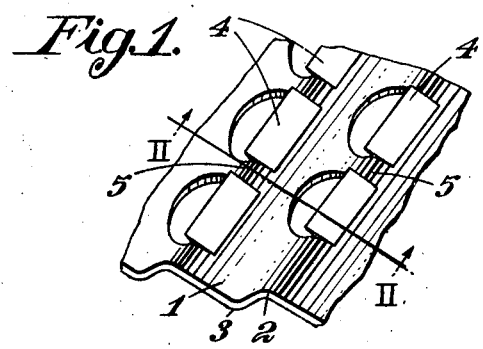
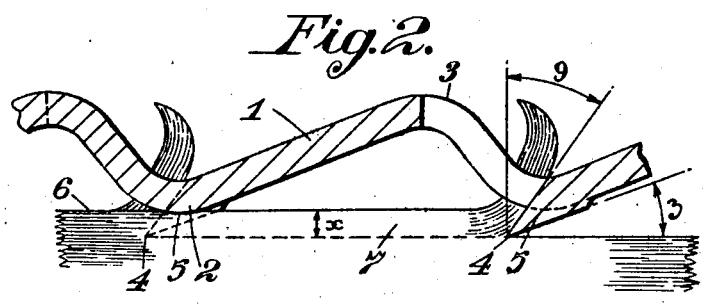
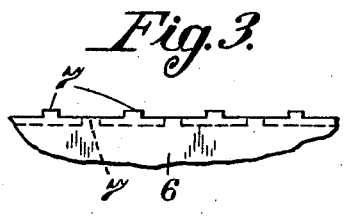
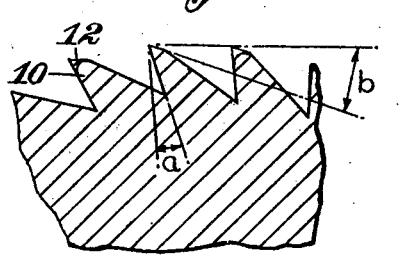    
Inventor
Christopher Hodgson Booth
by Hoynes, Leonard & Glenn
his attorneys

United States Patent Office 2,769,225
Patented Nov. 6, 1956

2,769,225

CUTTING AND ABRADING TOOL

Christopher Hodgson Booth, Sheffield, England, assignor to Firth-Brown Tools Limited, Sheffield, England, a British company Application May 2, 1952, Serial No. 285,673

Claims priority, application Great Britain May 3, 1951

10 Claims. (Cl. 29—78)

The invention relates to cutting tools of the type having a multiplicity of cutting edges and exemplified by files, rasps and milling cutters. Some of these tools such as many forms of milling cutters are unstable in that the cutting edges have substantial positive rake and clearance angles and the shape of the cutting edges is accordingly such as to tend to draw the edges deeper and deeper into the work. Such tools have, in use, to be positively held against such digging in of the edges and even so, unless the holding means are very firm and rigid, chatter of the tool may occur. Other tools of this kind such as files and rasps cannot be provided with efficient cutting edges having positive rake angles because of the tendency of such edges to dig into the work and consequently it has been necessary to employ in such tools edges with inefficient negative rake angles. The present invention has for its object the provision of simple means by which the tendency to dig in of multi-edged tools having cutting edges with positive rake and clearance angles may be presented or reduced and hence of enabling more efficient cutting edges with positive rake to be employed for those tools which are not positively held and of reducing the tendency to chatter of those tools which are so held in use.

The invention provides a multi-edge cutting tool of the kind described having cutting edges with positive rake and clearance angles and having at least some of the edges divided along their length into parts and, between the parts of each edge so divided, non-cutting ramp-like surfaces below the cutting edge by an amount equal to the maximum permissible depth of cut desired, whereby when the edge is cutting to its maximum depth the non-cutting surfaces rub on the work and so prevent the edge from cutting deeper.

The non-cutting surfaces may be below the cutting edge by say 0.001 to 0.004 inch in the case of a file or other hand tool and in the case of a milling cutter or other machine tool 0.001 up to say 0.010 inch.

Successive cutting edges may be divided as aforesaid and the divisions in the several edges may be staggered in relation to the direction of cutting movement.

Some specific examples of tools according to the invention will now be described with reference to the drawings in which:

Figure 1 is a perspective view of a cutting element of strip material,

Figure 2 represents to an enlarged scale a section on the line II—II of Figure 1 and shows the cutting operation, Figure 3 is a diagram showing a section through the work during cutting by the element shown in Figures 1 and 2, Figure 4 is a section through a part of a milling cutter, and Figure 5 is a front view of one of the cutting teeth of the milling cutter.

The element shown in Figures 1 and 2 consists of a strip of case-hardened steel 1 reversely bent at 2 and 3 to a zig-zag form and having projecting along each of the ridges 2 cutting edges 4 which are divided into separate parts by portions 5 of the ridges. The portions 5 are below the cutting edges by an amount ($x$ in Figure 2) equal to the maximum depth of cut which the edges are intended to take. When, as indicated in Figure 2, the edges are cutting to the maximum extent the portions 5 rub on the work 6 so preventing the edges cutting deeper and controlling the instability of the tool arising from the fact that the edges have rake angles $y$ and clearance angles $z$. As shown in Figures 2 and 3 the portions 5 are rounded to form ramps which ride over the work and are non-cutting. Accordingly the portions 5 leave ridges 7 on the work, these ridges being removed by the succeeding cutting edges. The relative lengths of the cutting edges 4 and portions 5 are chosen to suit the material with which the tool is to be used; the portions 5 being longer, in proportion, for soft materials than for hard materials.

Figure 4 illustrates the application of the invention to a milling cutter of which the teeth 10 have rake and clearance angles $a$ and $b$. The cutting edge 11 of each tooth of the cutter is divided in its length by notches 12 having curved, non-cutting bases. The depth (e. g. 0.010 inch) of the notches is such that when the edge is cutting to the maximum depth desired the bases of the notches rub on the work and so prevent the edge cutting deeper. The curved form of the rubbing surfaces causes them to operate like ramps and to ride over the work without cutting. The notches in succeeding teeth are staggered and hence the uncut ridges left by the notches in one edge are removed by the next edge.

The invention may also be applied to a file of the single cut type (e. g. having milled teeth) in which case the teeth may have notches like those provided in the milling cutter just described.

The tools according to the invention all have means permitting clearance of the chips produced by the cutting edges. Thus in the construction shown in Figures 1 and 2 the holes in front of the edges fulfill this purpose as shown in Figure 2 and in the cases of files and milling cutters there are grooves or gullets within which the chips are received. These grooves or gullets are of greater depth below the cutting edges than are the rubbing surfaces.

It is known to provide notches in cutting edges as for example in a cross-cut file the first cut forms notches in the overcut and in some tools notched edges are provided for the purpose of breaking up the chips. The notches in such tools do not however fulfil. The purpose of the present invention either because the edges do not have positive rake angles and so do not tend to dig in or because the notches cut the work or both.

I claim:

1. A cutting tool of the kind comprising a tool body having a multiplicity of successive cutting edges on one surface thereof, the edges having positive rake and clearance angles and all facing in the same general direction for cutting, and at least some of the edges being divided along their length by spaced parts which are staggered in relation to the parts of other edges and which form, non-cutting rubbing surfaces with ramp-like leading portions, which rubbing surfaces lie below the cutting edges by an amount equal to the maximum permissible depth of cut desired and, passageways in front of the cutting edges at a level substantially below the rubbing surfaces, for clearance of chips, said passageways leading to an external surface of the body, whereby when the edges are cutting to the maximum depth the non-cutting surfaces rub on the work and so prevent the edges from cutting deeper and also prevent the surface of the work from closing the clearance passageways.

2. A tool as claimed in claim 1 in which the non-cutting leading portions of the surfaces are curved about axes parallel to the cutting edges and present rounded surfaces to the work during cutting.

3. A tool is claimed in claim 1 in which the non-cutting rubbing surfaces are 0.001 to 0.004 inch below the cutting edges.

4. A tool as claimed in claim 1 in which the non-cutting rubbing surfaces are 0.001 to 0.010 inch below the cutting edges.

5. A tool as claimed in claim 1 in which the aforesaid clearance passageways are constituted by gullets in front of the cutting edges and extending in the direction of the edges.

6. A tool as claimed in claim 1 in which the passageways aforesaid are constituted by holes through the body of the tool in front of the cutting edges.

7. A tool as claimed in claim 1 in which the cutting edges lie in a single plane.

8. A tool as claimed in claim 1 in which the body is of circular section and the cutting edges lie on the circumferential surface.

9. A cutting tool comprising a body having parallel rows of spaced holes, each hole having one side sharpened and hardened, the body being reversely bent along lines parallel to the rows of holes into a succession of ridges with the sharpened edges extending from the ridges above the general plane formed by the ridges and at a suitable angle for cutting to the said plane, the tops of the portions of the ridges between the edges being rounded.

10. A tool as claimed in claim 9 in which the sharpened edges extend above the tops of the ridges by an amount between 0.001 and 0.010 inch.

References Cited in the file of this patent

UNITED STATES PATENTS

| | | |
|---|---|---|
| 973,780 | Harvey | Oct. 25, 1910 |
| 1,053,639 | Parkes | Feb. 18, 1913 |
| 1,202,195 | Lees | Oct. 24, 1916 |
| 1,479,073 | Howard | Jan. 1, 1924 |
| 1,884,185 | Peiseler | Oct. 25, 1932 |
| 2,182,067 | Bruecker | Dec. 5, 1939 |
| 2,278,738 | Praeg | Apr. 7, 1942 |
| 2,534,591 | Geurian | Dec. 19, 1950 |
| 2,608,222 | Jensen et al. | Aug. 26, 1952 |
| 2,622,636 | Cox | Dec. 23, 1952 |

FOREIGN PATENTS

| | | |
|---|---|---|
| 19,840 | France | June 1, 1915 |
| 128,378 | Switzerland | Dec. 1, 1928 |
| 641,587 | France | Aug. 7, 1928 |
| 666,573 | Great Britain | Feb. 13, 1952 |
| 666,622 | Great Britain | Feb. 13, 1952 |
| 697,773 | France | Nov. 5, 1930 |